United States Patent

[11] 3,566,894

| [72] | Inventor | Takehito Satoh |
| | | Yokohama, Japan |
| [21] | Appl. No. | 736,102 |
| [22] | Filed | June 11, 1968 |
| [45] | Patented | Mar. 2, 1971 |
| [73] | Assignee | Isuzu Motors Ltd. |
| | | Tokyo, Japan |

[54] HYDRAULIC PRESSURE GOVERNOR VALVE
21 Claims, 15 Drawing Figs.

[52] U.S. Cl................................................. 137/54,
73/537, 137/56
[51] Int. Cl........................................................ G05d 13/10
[50] Field of Search........................................ 137/56, 54;
73/537, 538, 536, 535, 539, 540, 542, (Inquired)

[56] References Cited
UNITED STATES PATENTS

| 2,213,824 | 9/1940 | Seeley | 73/537X |
| 2,786,667 | 3/1957 | Gaubatz | 73/537X |
| 2,876,784 | 3/1959 | Adams | 137/56 |
| 3,049,028 | 8/1962 | English | 137/56X |
| 3,212,514 | 10/1965 | Kelley | 137/56 |
| 3,279,486 | 10/1966 | Duffy | 137/56X |
| 3,420,251 | 1/1969 | Forster | 137/56 |

FOREIGN PATENTS

| 384,543 | 12/1932 | Great Britain | 73/537 |

Primary Examiner—Clarence R. Gordon
Attorney—George B. Oujevolk

ABSTRACT: A hydraulic pressure governor valve which is connected so as to be driven by a rotary shaft has a valve casing, in which a sleeve valve is disposed within a radial bore formed in the valve casing so that when the shaft rotates, the centrifugal force acting upon the valve provides a regulated output i.e., governor pressure. A number of weights $n$ are slidably disposed on the valve, on which are spring means which act radially inwards, whereby the governor pressure can be regulated to increase in $(n + 1)$ steps in proportion to increasing speed of the shaft.

INVENTOR.
Takehito Satoh
BY George B. Oujevolk
Attorney

INVENTOR.
Takehito Satoh
BY George B. Oujath
Attorney ly used improvements have been made in such a manner that the governor valve is assembled from more than two valve casings or divided into more than two valve casings each having a sleeve valve so that a two- to three-step-action of the governor valve may be obtained. For example, the governor pressure regulated by a three-step-action valve is increased in proportion to the velocity of the vehicle in three steps so that the operational range of governor pressure is considerably enlarged.

HYDRAULIC PRESSURE GOVERNOR VALVE

BRIEF SUMMARY OF THE INVENTION

The present invention relates to a governor valve for a hydraulic control device and more particularly to a governor valve for an automatic transmission of a vehicle. The conventional governor valve used in an automatic transmission of a vehicle generally has such a construction that the governor valve is disposed on the output shaft within a transmission, and has a sleeve valve in order that the governor pressure may be produced by utilizing the centrifugal force acting on the sleeve valve. Therefore, the regulated governor pressure is a quadratic function of, and proportional to, the speed of rotation of the output shaft or vehicle speed (illustrated on the graph of FIG. 3 by the curve between points 0 and F). Consequently, the governor pressure regulated by the one-step-action governor valve is too small to be utilized in the automatic transmission operation at lower speeds while it is too high at higher speeds.

In view of the above, in the conventional governor valves presently used improvements have been made in such a manner that the governor valve is assembled from more than two valve casings or divided into more than two valve casings each having a sleeve valve so that a two- to three-step-action of the governor valve may be obtained. For example, the governor pressure regulated by a three-step-action valve is increased in proportion to the velocity of the vehicle in three steps so that the operational range of governor pressure is considerably enlarged.

This type of a governor valve is disclosed in U.S. Pat. No. 3,711,464. However, when such a governor valve as described above is utilized in a high-class automatic transmission in which broader speed ranges and many types of automatic gear shifting are desired, or, when the governor pressure curve is to be regulated freely so as to be widely applicable to various types of gear shifting, a three-step-action is not sufficient so that the shift point must be changed. In other words, since the desired governor pressure is not obtained, the selection of the shift point which is one of the factors to determine the character or performance of the automobile is limited.

Furthermore, when the governor valve of the type described above is utilized in a high-class transmission, a combination of governor valves is required so that the construction becomes much too complicated to be used in practice.

In view of the above, one of the objects of the present invention is to provide a novel governor valve in which all of the defects described above can be eliminated.

Another object of the present invention is to provide a novel governor valve for an automatic transmission of a vehicle having a number of operations or action steps of governor pressure, i.e., more than that of the conventional governor valve, and, permitting the free regulation of the governor pressure to be demanded by the vehicle.

A further object of the present invention is to provide an improved governor valve for use in a general hydraulic equipment or apparatus in which the variation in the governor pressure which is increased in proportion to the rotational speed thereof can be finely controlled.

Yet another object of the present invention is to provide a novel governor valve which is simple in construction and easy to manufacture, but which permits the wider operational range of governor pressure as compared with the conventional governor valve.

According to the present invention there is provided a fluid pressure governor valve connected so as to be driven by a rotary shaft comprising, a valve casing formed with a stepped radial bore therein, a sleeve valve having two different diameter lands and an annular groove formed therebetween and slidably disposed within said bore, a fluid inlet passage in the casing opening into said bore for supplying fluid under line pressure into said bore and a fluid outlet passage in the casing for delivering the regulated governor pressure from said bore, a number of weights $n$ disposed on the sleeve valve against which spring means act radially inward, and adapted to slide outward a predetermined stroke, whereby the governor pressure can be regulated to increase in proportion to the rotational speed of the shaft in $(n+1)$ steps. The above and other objects, features and effects of the present invention will be more readily understood from the following description with reference to the accompanying drawings.

DETAILED DESCRIPTION OF THE INVENTION

Figure 1:
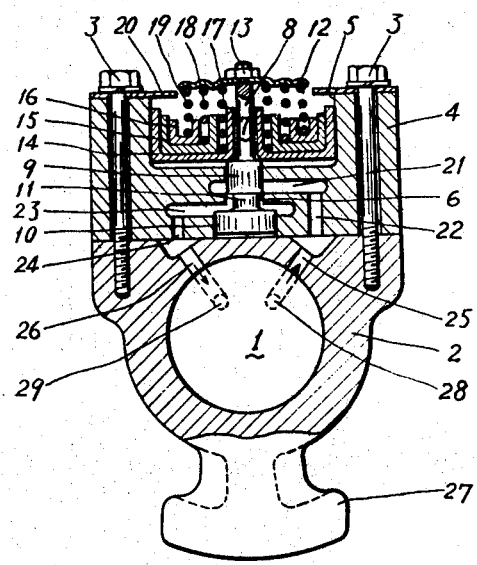
FIG. 1 is a cross-sectional view of a hydraulic pressure governor valve according to the present invention for the automatic transmission of a vehicle.

Now referring to FIG. 1, a novel hydraulic pressure governor valve adapted to be used with a fluid control system (not shown) for an automatic transmission of a vehicle comprises an output shaft 1, a casing 2 keyed to the output shaft 1 and a valve casing 4 fixed to the casing 2 by means of bolts 3. The valve casing 4 has a cylindrical radial cavity 5 at the center portion and the bottom of which is formed with a stepped radial bore 6 and a sleeve valve 7 is slidably disposed within the bore 6.

The sleeve valve 7 is formed with a stem 8, a small land 9 and a larger land 10 and an annular groove 11 formed between the lands. At the end of the stem 8 a retainer 12 is fixed thereto, by means of a nut 13. The sleeve valve 7 is further provided with three weights 14, 15 and 16 and springs 17, 18 and 19.

Figure 2:
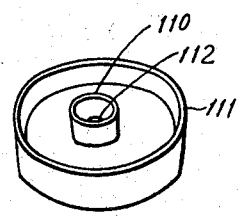
FIG. 2 is a perspective view of a weight used in the governor valve shown in FIG. 1.

Each weight, 14, 15 and 16 as shown in FIG. 2 (which particularly shows the weight 14), has annular flanges 110 and 111 extending in the same direction from the center and peripheral portions respectively. The center flange 110 defines a hole 112. The sizes of the holes 112 of the weights 14, 15 and 16 are enlarged in the order named while the peripheral flanges 111 of the weights 14, 15 and 16 reduce their diameters in the order named. Furthermore, the heights of the center flanges 110 and of the peripheral flanges 111 of the weights 14, 15 and 16 are reduced in the order named. In the embodiment shown in FIG. 1, the weights 14, 15 and 16 become lighter in the order named. The strengths of the load spring 17, 18 and 19 are increased or stronger in the order named. It is not necessary that the height of the flange 110 be equal to that of the flange 111.

The weight 14 having the largest outer diameter is carried by the stem 8 of the sleeve valve 7 for sliding movement through the center hole of the weight 14, and is pressed against the small diameter land 9 of the sleeve valve 7 by means of the spring 17 located between the retainer 12 and the weight 14. The remaining weights 15 and 16 are disposed in the superimposed relation within the weight 14, and the weight 15 is pressed against the weight 14 by means of the spring 18 while the weight 16, to the weight 15 by means of the spring 19. The peripheral flange of the weight 14 is slidably disposed within the cylindrical cavity 5 of the valve casing 4 while the peripheral flanges of the weights 15 and 16 are disposed for sliding movement inwardly of the peripheral flange of the weights 14 and 15 respectively, thereby providing the guide for the movements of the weights 14, 15 and 16.

In order to limit the displacement of each weight 14, 15 or 16 due to the centrifugal force, a stopper 20 is fixed to the casing 4 by means of bolts 3. The valve casing 4 is formed with a fluid inlet passage (conduit) 22 in communication with a port 21 opening into the radial bore 6 and another fluid outlet passage in communication with a port 23 opening also into the radial bore 6.

The casing 2 is formed with a passage 25 in communication with the passage 22 and another passage 26 in communication with the passage 24. The casing 2 is further provided at one end portion thereof with a counter balance 27.

The output shaft 1 is provided with a fluid supply passage 28 which is connected to the passage 25 in the casing 2 and to a governor feed line (not shown) in the fluid control system from a hydraulic pressure source and a fluid outlet passage 29 connected to the passage 26 in the casing 2 and to a governor pressure line (not shown) in the system for leading out the governor pressure regulated by the governor valve.

Figure 3:
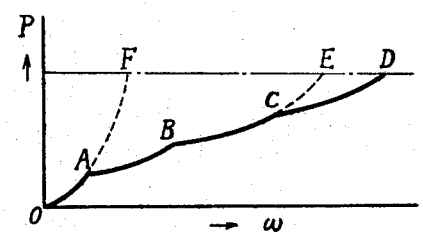
FIG. 3 is a graph showing the relation between the governor pressure $P$ and the rotational speed $\omega$ of a shaft (or vehicle speed) of the governor valve shown in FIG. 1.

The difference between the present invention is graphically illustrated in FIG. 3, wherein the three-step-action of the prior art is shown as three continuous curved lines between the points O and A; A and B; and B and E, whereas the present invention provides four-step-action between the points O and A; A and B; B and C; and C and D.

Now with reference to FIGS. 4 to 11, the mode of operation of the governor valve having a construction of type described above according to the present invention will be described in detail hereinafter.

Figure 4:
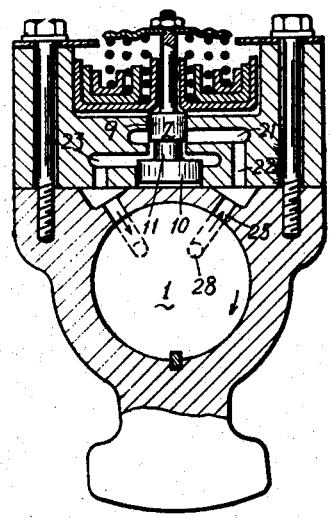
FIGS. 4 to 7 shows the cross-sectional views illustrating the operation stages or steps of the governor valve shown in FIG. 1.
Figure 5:
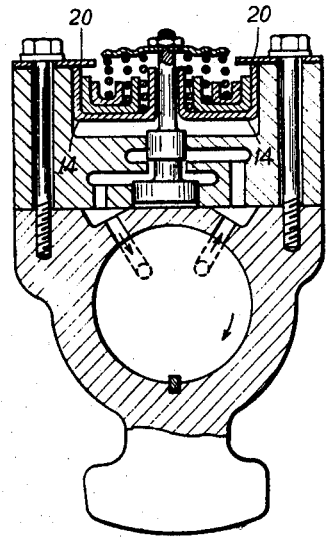

Line pressure is directed to the port 21 through the supply passage 28, the passage 25 and the inlet passage 22. When the shaft 1 and the governor valve are set into rotation the centrifugal force is exerted upon the sleeve valve 7 so that it tends to move radially outwardly, thereby opening the port 21, and the line pressure is admitted into the annular groove 11 between the lands 9 and 10. Since the diameter of the land 10 is larger than that of the land 9, the force due to the line pressure acting on the differential area so that the valve 7 is caused to retract inwardly, thereby tending to close the port 21. Because of the repetition of the operation or action described above of the sleeve valve 7, the output pressure, that is the governor pressure, which is a function of, and proportional to, the rotation speed of the output shaft 1, that is, the quadratic function of the speed of the vehicle is produced and directed toward the port 23. When the rotational speed of the output shaft 1 is less than a predetermined speed, the force due to the springs acting on the weights is stronger than the centrifugal force so that none of weights 14, 15 and 16 are permitted to be displaced (see FIG. 4). In this condition, the governor pressure (output pressure) is illustrated on the thick line curve of FIG. 8. When the rotation of the output shaft 1 increases to reach a predetermined speed, the centrifugal force exerting upon the weight 14 overcomes the springs so that the weight 14 is caused to move outwardly, piloted through the stem 8 of the valve or the cylindrical cavity 5, whereby all of the weights move outwardly as shown in FIG. 1 or FIG. 4. Therefore, the highest peripheral flange 111 of the weight 14 is finally abutted or pressed against the stopper 20 as shown in FIG. 5 so that the weight 14 cannot move outwardly beyond the stopper 20 any longer. The governor pressure generated in the above described mode of operation is shown by the thick line curve between the points O and A in FIG. 9.

Figure 6:
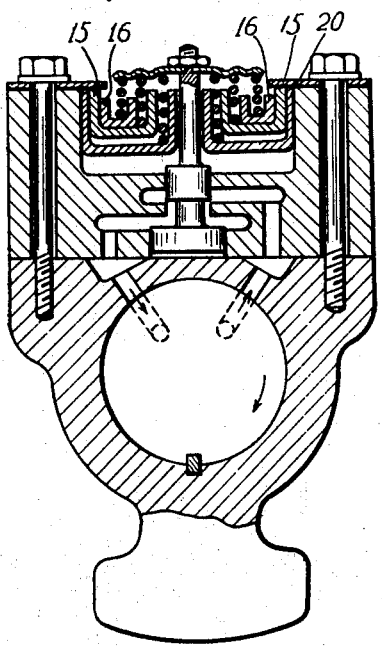

Therefore, the mass upon which the centrifugal force is exerted will become the initial mass minus the mass of weight 14 for all speeds higher than that illustrated by point A. Thus, when the rotation of the output shaft 1 is further increased the weight 15 is caused to move outwardly together with weight 16 in the same manner as described hereinbefore, so that the peripheral flange of the weight 15 is finally pressed against the stopper 20 as shown in FIG. 6. In this operation stage, the governor pressure is shown by the thick line curve between the points A and B in FIG. 10. When the rotation of the output shaft 1 is further increased to a speed higher than that which has made the weight 15 press against the stopper 20 as described above, the mass upon which is exerted the centrifugal force will become said initial mass minus the mass of the weight 15 in additional to the weight 14.

Figure 7:
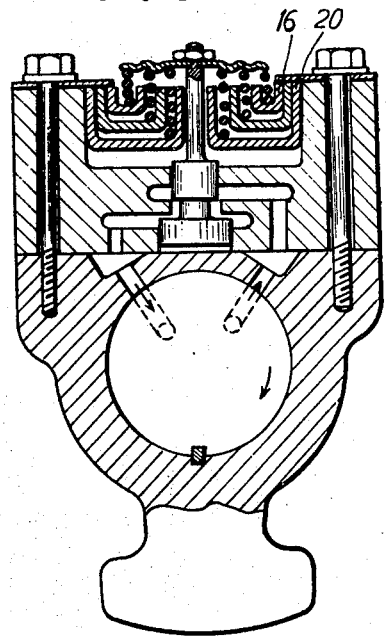
Figure 8:
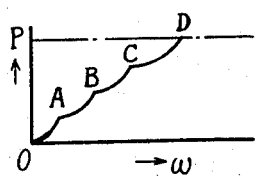
FIGS. 8 to 11 the graphs showing the relations between the governor pressure $P$ and the rotational speed $\omega$ of the shaft or vehicle speed corresponding to the stages shown in FIGS. 4 to 7.
Figure 9:
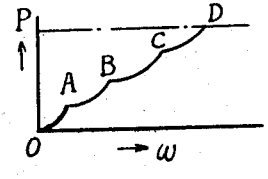
Figure 10:
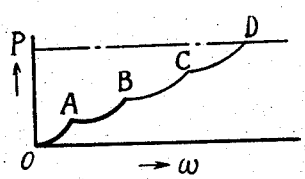
Figure 11:
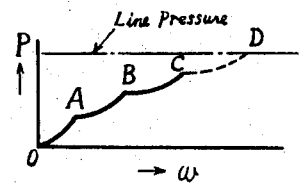

Thus, when the rotation of the output shaft 1 is increased further, the weight 16 is caused to move outwardly so that the peripheral flange of the weight 16 is made to press against the stopper 20 (as shown in FIG. 7) in the same manner or mode of operation as described above. In this case, the governor pressure is shown by the thick line curve between the points B and C in FIG. 11.

At this stage the whole of the weights 14, 15 and 16 are pressed against the stopper 20 so that the sleeve valve 7 is exerted only with the compressive force of the whole springs. Therefore, the mass upon which is exerted the centrifugal force is the initial mass minus the whole mass of the weights 14, 15 and 16, so that the mass under the influence of the centrifugal force is the minimum.

Thus, the mode of operation remains unchanged beyond the above described rotational speed of the output shaft 1 at which all of the weights 14, 15 and 16 are pressed against the stopper 20 by the centrifugal force. The governor pressure may continue to increase along the dotted line curve between the points C and D in FIG. 11.

At the point D, the governor pressure reaches the line pressure. When the rotation of the output shaft 1 is decreased, the modes of the operation of the pressure governor valve of the present invention are the reverse of the modes of operation when the rotation is increased as described above.

As is clear from the description above, the governor valve of the present invention provides a regulated governor pressure that is a function of and proportional to the rotational or vehicle speed as shown by four-stages or -steps continuous curved lines between the points O and D in FIG. 3.

Figure 12:
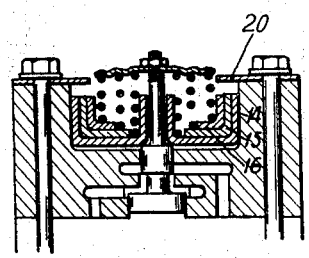
FIGS. 12 and 13 are fragmentary cross-sectional views illustrating other installation methods of the weight of the governor valve shown in FIG. 1.

The distances from the weights to the stopper 20 which determine the distances of slide of the weights may be equal as shown in FIG. 12. In this case, the pressure governor valve must be designed such that the weights are caused to slide from the innermost one, that is in the order of the weights 16, 15 and 14.

Figure 13:
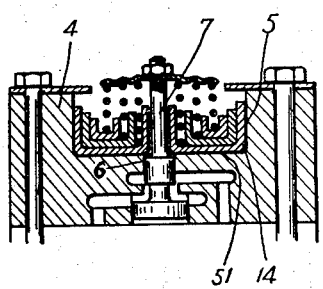
Figure 14:
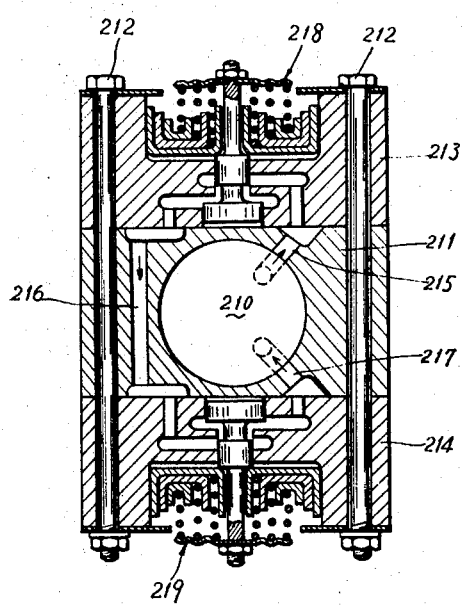
FIGS. 14 and 15 are cross-sectional views of other embodiments of the hydraulic pressure governor valve according to the present invention. Throughout the FIGS., similar reference numerals designate similar parts.

Furthermore, it is not necessary to provide the center flange 110 of each of the weights 15 and 16 (see FIG. 12). Furthermore, it is not necessary to provide the center flange 110 of each of the weights 15 and 16 (see FIG. 12). The guide (pilot) for the sliding movement of the outermost weight 14 may be effected only by the stem 8 of the sleeve valve 7 or only by the cylindrical cavity 5 of the casing 4. In case of the embodiment shown in FIG. 12, one spring must be located for each of weights. As shown in FIG. 13, the outermost weight 14 slidably disposed along the sleeve valve 7 may be directly pressed against the substantially smooth bottom portion 51 (in this case, the above described stepped radial bore 6 is opened) of the cylindrical cavity 5 of the casing 4 by means of spring means. Now with reference to FIG. 14, another embodiment of the present invention will be described hereinafter. The governor valve shown in FIG. 14 incorporates two valve mechanisms shown in FIG. 1 on both sides of the output shaft 210, and comprises a casing 211 keyed to the output shaft 210, a first valve casing 213 fixedly attached to the one side of the casing 211 by means of bolts 212 and providing with first sleeve valve means 218, a second valve casing 214 secured to the other side of the casing 211 and providing with second sleeve valve means 219.

The constructions and the modes of operation of both of the sleeve valve means 218 and 219 are substantially similar to those described with reference to FIG. 1 so that the detailed description will not be made.

A fluid having a line pressure flows from a fluid inlet passage 215 of the output shaft 210 through the valve means 218 of the first valve casing 213, a fluid communication passage 216 of the casing 211 and the valve means 219 of the second valve casing to a fluid outlet passage 217 of the output shaft for providing a regulated governor pressure. There are many modes of the operation of the governor valve having a construction described above, but the most simplest mode of operation will be described hereinafter. First, the second valve means 219 provides the regulated pressure which varies in four steps as shown in the graph in FIG. 3. However, it must be noted here that the pressure has not yet reached the line pressure. When the rotation of the output shaft 210 is further increased so that the centrifugal force exerting upon a sleeve valve within the second valve means 219 becomes stronger than the force having the tendency to return the sleeve valve in the second valve means 219 by the pressure which is regulated by the first valve means 218, then the second sleeve valve means 219 looses its regulating function. Next, therefore, the pressure regulated by the first valve means 218 is directly directed toward the passage 217 as governor pressure so that in addition to the above described four-steps curved lines, four more governor pressure curves are obtained, whereby the governor pressure which varies in eight steps can be obtained.

Figure 15:
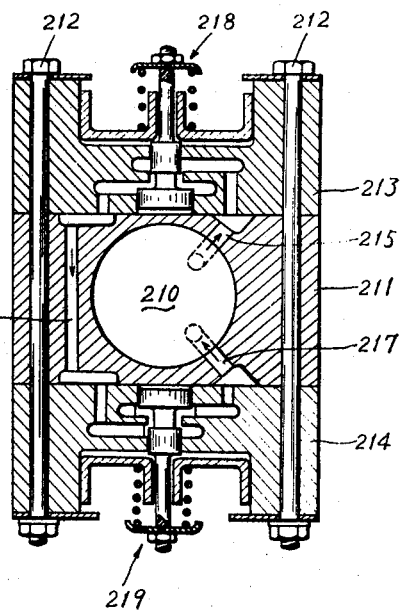

In a hydraulic pressure governor valve shown in FIG. 15, the governor pressure varies in four steps as in the case of the governor valve shown in FIG. 1. The construction and the mode of the operation of the governor valve shown in FIG. 15 are substantially same with those shown in FIG. 14 and similar numerals designate similar parts so that the detailed description will not be made. However, only one weight is disposed on each sleeve valve.

The governor valve according to the present invention which has been described in detail hereinbefore has the following features. In the governor valve shown in FIG. 1 in which the number of $n$ ($n \geq 1$) weights and the number of $n$ springs are assembled with one sleeve valve, the governor pressure which can be shown by ($n + 1$) continuous curved lines, that is ($n + 1$) different pressure steps or ranges can be obtained. In the governor valve shown in FIG. 14 or 15 in which the numbers of weights and springs $k$ are $n$ ($n \geq 1$) in one sleeve valve means while the numbers of the weights and the springs on the other sleeve valve means are $m$ ($m \geq 1$), the governor pressure which can be shown by ($n + m + 2$) continuous curved lines, that is ($n + m + 2$) different pressure steps or ranges can be obtained. These curved lines are the quadratic function of the velocity of the vehicle $\omega$. Therefore, by selecting suitable numbers of $m$ and $n$ weights and springs, the strength of the spring, the mass upon which is exerted the centrifugal force, the pressure line which is consisting of a plurality of continuous curved lines whose derivatives are different from each other can be theoretically obtained, and any suitable governor pressure can be obtained as far as the derivatives are positive. Furthermore, the construction of the governor valve according to the present invention is simple so that a multistage governor pressure can be obtained from the governor valve which occupies only a little space. Therefore, when the governor valve of the present invention is incorporated in a high-class automatic transmission mechanism having many speed change shifts, the automatic gear shifting may be operated precisely and the shifting point can be also freely programmed. The governor valve of the present invention can be also widely used not only with an automatic transmission for an automobile but also in other hydraulic devices, apparatus, equipments machines or the like.

I claim:

1. In a hydraulic pressure governor valve connected so as to be driven by a rotary shaft having a valve mechanism comprising a valve casing formed with a stepped radial bore therein, a sleeve valve slidably disposed within said bore and having two different diameter lands and an annular groove formed between the lands, a fluid inlet passage opening into said bore for supplying fluid under pressure, and a fluid outlet passage for delivering the governor pressure wherein said valve mechanism further comprises at least three weights disposed on the sleeve valve each of which pressed by means of spring means radially inwardly and adapted to move radially outwardly in a predetermined stroke, whereby the governor pressure is regulated so as to increase in proportion to the rotational speed of said shaft in ($n + 1$) steps where $n$ is the number of weights.

2. In a hydraulic control device having a rotary shaft connected to a driving means a fluid pressure source, a governor valve connected to be driven by said rotary shaft and comprising a valve casing formed with a stepped radial bore therein, a sleeve valve slidably disposed within said bore and having small and large diameter lands and an annular groove formed therebetween and adapted to move radially outwardly by the centrifugal force, a fluid inlet port, defined by said small land formed within said casing and in communication with said fluid pressure source for directing the pressure into said bore, a fluid outlet port formed within said casing for delivering governor pressure from said valve which increases in proportion to the increase of rotational speed of said rotary shaft, wherein said governor valve further comprises:
 a. at least three weights disposed in a superimposed relation on said valve for radially slidable movement so as to transmit the centrifugal force acting on it to said valve;
 b. spring-retaining means securely fixed to one end of said sleeve valve;
 c. spring means located between said weights and the spring-retaining means for preventing said radially slidable movement of said weights at a rotational speed less than at a predetermined speed of said rotary shaft; and
 d. stop means secured to said casing spaced from said weights for sequentially preventing said radially slidable movements of said weights, whereby the centrifugal force acting on said weight and transmitted to said sleeve valve is gradually reduced as the rotational speed of said rotary shaft is increased, thereby causing the governor pressure to increase in ($n + 1$) steps where $n$ is the number of weights.

3. A governor valve according to claim 2, wherein the distances between said stop means and said weights are all equal.

4. A governor valve according to claim 2, wherein at least one of said distance between said stop means and said weights is different from the other.

5. In a hydraulic control device having a rotary shaft connected to a driving means, a fluid pressure source, a governor valve connected to be driven by said rotary shaft and comprising a valve casing formed with a stepped radial bore therein, a sleeve valve is slidably disposed within said bore and having small and large diameter lands and an annular groove formed therebetween and adapted to move radially outwardly by the centrifugal force, a fluid inlet port defined by said small land formed within said casing and in communication with said fluid pressure source for directing the pressure into said bore a fluid outlet port formed within said casing for delivering governor pressure from said valve which increases in proportion to the increase of rotational speed of said rotary shaft, wherein said governor valve further comprises:
 a. at least three weights disposed in superimposed relation on said valve for radially slidable movement so as to transmit the centrifugal force to said valve and having different diameter holes at the centers thereof;
 b. spring-retaining means securely fixed to one end of said sleeve valve;
 c. at least one spring means located between said weights and said retaining means for preventing said radially slidable movement of said weights at rotational speed less than a predetermined speed of said rotary shaft;
 d. stop means secured to said casing for preventing sequentially said radially slidable movements of said weights; and e. said weights having flange portions which engage with said stop means at the end of said radially slidable movements of said weights, whereby the centrifugal force acting on said weights and transmitted to said sleeve valve is gradually reduced as the rotational speed of said rotary shaft is increased, thereby causing the governor pressure to increase in $(n + 1)$ steps where $n$ is the number of weights.

6. In a hydraulic control device having a rotary shaft connected to a driving means, a fluid pressure source, a governor valve connected to be driven by said rotary shaft and comprising a valve casing formed with a stepped radial bore therein, a sleeve valve slidably disposed within said bore and having small and large diameter lands and an annular groove formed therebetween and adapted to move radially outwardly by the centrifugal force, a fluid inlet port, defined by said small land, formed within said casing and in communication with said fluid pressure source for directing the pressure into said bore, a fluid outlet port formed within said casing for delivering governor pressure from said valve which increases in proportion to the increase of rotational speed of said rotary shaft, wherein said governor valve further comprises:
   a. a number of $n$ weights disposed on said valve for transmitting the centrifugal force acting on it to said sleeve valve;
   b. spring-retaining means securely fixed to one end of said sleeve valve;
   c. the first weight of said weights having a cylinder portion at the center thereof and a annular peripheral flange at the periphery thereof and being directly supported on said valve by means of said cylindrical portion for slidable movement;
   d. the remaining weights of said weight being disposed sequentially in superimposed relation upon said first weight for radially slidable movement and each having a central hole whose diameter is larger than said cylindrical portion of said first weight and a annular peripheral flange whose diameter is smaller than that of said annular peripheral flange of said first weight;
   e. said annular peripheral flange of said $n$ weights being adapted to slidably receive along the inner surfaces of said annular peripheral flanges the annular peripheral flange of one of said weights, thereby serving as a guide for said radially slidable movement of said one weight;
   f. at least one spring located between said weights and said retaining means for preventing said radially slidable movement of said weights at a rotational speed less than a predetermined speed of said rotary shaft; and
   g. stop means secured to said valve casing spaced from said peripheral flanges for engagement with said peripheral flanges of said weights so as to prevent said radially slidable movements of said weights, whereby the centrifugal force acting on said weights and transmitted to said sleeve valve is gradually reduced as the rotational speed of said rotary shaft is increased, thereby causing the governor pressure to increase in $(n+1)$ steps.

7. A governor valve according to claim 6, wherein is further comprising guide means formed in said casing, and said radially slidable movement of said first weight can be guided by engagement of said annular peripheral flange with said guide means.

8. A governor valve according to claim 7, wherein said guide means is formed of a radial cylindrical cavity formed within said casing.

9. A governor valve according to claim 8, wherein said stop means is disposed so as to extend on said cylindrical cavity.

10. A peripheral flange of each of said weights defined in claim 6, wherein the heights of said peripheral flanges are different from each other so that the distances from said peripheral flanges to said stop means are made different from each other.

11. In a hydraulic control device having a rotary shaft connected to a driving means, a fluid pressure source, a governor valve connected to be driven by said rotary shaft and comprising a valve casing formed with a stepped radial bore therein, a sleeve valve slidably disposed within said bore and having small and large diameter lands and annular grooves formed therebetween and adapted to move radially outwardly by the centrifugal force, a fluid inlet port, defined by said small land, formed within said casing and in communication with said fluid pressure source for directing the pressure into said bore, a fluid outlet port formed within said casing for delivering governor pressure from said valve which increases in proportion to the increase of rotational speed of said rotary shaft, wherein said governor valve further comprises:
   a. a stem extending from said small diameter land said sleeve valve;
   b. a number of $n$ weights disposed on said stem for transmitting the centrifugal force acting on it to said valve;
   c. a retainer securely fixed to the top of said stem;
   d. the first weight of said $n$ weights having annular flanges extending in the same direction from the center and the periphery thereof respectively and directly supported on said stem by means of a cylindrical portion defined by said center flange;
   e. the remaining weights of said $n$ weights disposed sequentially in superimposed relation upon said first weight, and having a center hole and an annular peripheral flange, for permitting the radially slidable movement of said weight;
   f. spring means located between said weights and said retainer for preventing said radially slidable movements of said weights at a rotational speed less than a predetermined speed of said rotary shaft; and
   g. stop means secured to said casing spaced from said flanges for engagement with each of said annular peripheral flanges of said weights so as to prevent said radially slidable movements of said weights, whereby the centrifugal force acting said weights and transmitted to said sleeve valve is gradually reduced as the rotational speed of said rotary shaft is increased, thereby causing the governor pressure to increase in $(n+1)$ steps.

12. A governor valve according to claim 11, wherein said spring means consists of a number of $n$ springs.

13. A governor valve according to claim 11, wherein said annular peripheral flanges of said weights have such heights that said distances between the weights and the stop means are made different from each other.

14. A governor valve according to claim 11, wherein said annular peripheral flanges of said weights have such heights that said distances between the weights and the stop means are made equal.

15. A governor valve according to claim 11, wherein said rotary shaft is further provided with a counter balancer.

16. A governor valve according to claim 11, wherein said stem has a diameter smaller than that of said small diameter land, and said first weight is pressed directly against one end of said small diameter land by means of said spring means.

17. A governor valve according to claim 11, wherein said first weight is pressed directly against an opening end of said bore of said casing by means of said spring means.

18. In a hydraulic control device having a rotary shaft connected to a driving means, a fluid pressure source, and a governor valve connected to be driven by said rotary shaft and comprising a first valve casing formed with a stepped radial bore therein, a first sleeve valve slidably disposed within said bore for slidable movement radially outwardly by the centrifugal force and having small and large diameter lands and an annular groove formed therebetween, a fluid inlet port formed within said casing and in communication with said fluid pressure source for supply said fluid into said bore, the opening degree of said fluid inlet port being controlled by said small diameter land, a fluid outlet port formed within said casing and for providing output pressure which increases in proportion to the increase of rotational speed of said rotary shaft, a second valve casing formed with a stepped radial bore therein, a second sleeve valve slidably disposed within said bore for slidable movement radially outwardly by the centrifugal force and having small and large diameter lands and an annular groove formed therebetween, a second fluid inlet port formed within said casing and in communication with the fluid outlet port of said first casing for directing from said first sleeve valve the output pressure to said bore of said second valve casing, and defined by said small land, and a second fluid outlet port for delivering fluid from said bore, and wherein said governor valve further includes the arrangement wherein said first and second sleeve valves, each having a stem extending from said small diameter land and spring retaining means securely fixed to the top of said stem, first and second weights each having at the center thereof a cylindrical portion by which said weight is disposed on said stem for radially slidable movement and being adapted to transmit the centrifugal force acting on it to said sleeve valves, a first and second spring means each located between said weight and said spring-retaining means for preventing said radially slidable movement of said weight at a rotational speed less than a predetermined speed of said rotary shaft, a first and second stop means, each disposed in each of said casings spaced from said weight for limiting said radially slidable movement of said weight, the improvement therein wherein:
  a. a number of $n$ weights are disposed in superimposed relation upon said first weight for radially slidable movement and adapted to transmit impart the centrifugal force acting on it to said sleeve valve and said $n$ weights having a hole at the center thereof;
  b. said first spring means is adapted to impart force to said $n$ weights; and
  c. said first stop means disposed spaced from said $n$ weights is for preventing said radially slidable movement of said $n$ weights, whereby the centrifugal force acting on said weights and transmitting to said sleeve valve is gradually reduced as the rotational speed of said rotary shaft is increased, thereby increasing said governor pressure steps further by $n$ steps.

19. A governor valve according to claim 18, further comprising:
  a. a number of $m$ weights disposed in superimposed relation upon said second weight for radially slidable movement and adapted to transmit the centrifugal force acting it to said sleeve valve and having a hole at the center thereof;
  b. said second spring means adapted to impart the force to said $m$ weights; and
  c. said second stop means disposed spaced from said $m$ weights for preventing said radially slidable movements of said $m$ weights, whereby the centrifugal force acting on said weights and transmitted to said sleeve valve is gradually reduced as the rotational speed of said rotary shaft is increased, thereby increasing said governor pressure steps further by $m$ steps.

20. A governor valve according to claim 19, wherein all of said weights disposed on said first and second sleeve valves have annular flanges around the peripheries of said weights.

21. A governor valve according to claim 20, wherein the inner surface of each of said annular peripheral flanges of said weight is adapted to slidably receive the annular peripheral flange of one of said weights so as to serve to guide said radially slidable movement of said one weight.